United States Patent [19]

Koshiba et al.

[11] Patent Number: 4,595,643
[45] Date of Patent: Jun. 17, 1986

[54] AIR CELL ELECTRODE AND PROCESS FOR PREPARING ITS CATALYST

[75] Inventors: Nobuharu Koshiba, Nara; Hayashi Hayakawa, Osaka; Keigo Momose, Osaka; Akira Ohta, Osaka, all of Japan

[73] Assignee: Matsushita Electrical Industrial Co., Ltd., Osaka, Japan

[21] Appl. No.: 681,418

[22] PCT Filed: Jul. 21, 1983

[86] PCT No.: PCT/JP83/00234
§ 371 Date: Nov. 19, 1984
§ 102(e) Date: Nov. 19, 1984

[87] PCT Pub. No.: WO84/03799
PCT Pub. Date: Sep. 27, 1984

[30] Foreign Application Priority Data

Mar. 18, 1983 [JP] Japan .................................. 58-46247

[51] Int. Cl.$^4$ .................... H01M 4/00; H01M 4/86

[52] U.S. Cl. ......................................... 429/27; 429/40; 429/224

[58] Field of Search ........................... 429/27, 40, 224

[56] References Cited

U.S. PATENT DOCUMENTS 4,121,018 10/1978 Kocherginsky et al. ....... 429/224 X
4,269,691 5/1981 Deborski .......................... 429/224 X
4,405,699 9/1983 Kruger ............................... 429/224

FOREIGN PATENT DOCUMENTS 157068 9/1983 Japan .................................. 429/224

*Primary Examiner*—Brian E. Hearn
*Assistant Examiner*—S. J. Kalafut
*Attorney, Agent, or Firm*—Wenderoth, Lind & Ponack

[57] ABSTRACT

An air cell is disclosed, with a catalyst containing $MnO_x$ where $1.45 \leq x \leq 1.60$, the material having X-ray diffraction peaks corresponding to the lattice constants of $Mn_5O_8$.

14 Claims, 8 Drawing Figures

AIR CELL ELECTRODE AND PROCESS FOR PREPARING ITS CATALYST

TECHNICAL FIELD

This invention relates to improvements in catalysts for use in the air zinc cell, and is intended to provide an air zinc cell having excellent high-rate discharge characteristics and storage characteristics.

BACKGROUND ART

The cells to which the catalyst electrode of this invention are applicable include fuel cells using alkaline electrolytes, air zinc cells for stationary or installation use, etc. but is particularly useful for the air-zinc button cell.

The catalyst materials heretofore explored from very early times to the present day are various metals and metal oxides, activated carbon, carbon, etc. Thus, noble metals such as metals of the platinum group and silver as deposited on activated carbon or carbon black, mixtures of metal oxides with carbon, and mixtures of metal phthalocyanine complexes with carbon, whether heat-treated or not, may be mentioned by way of example.

Generally, noble metal elements represented by platinum and palladium have relatively high catalyst activity but when the difficulty of regeneration for reuse is taken into consideration, as it is important in the case of primary cells such as air-zinc button cells, noble metal catalysts have the disadvantage that they cannot be provided at low cost.

For the above reason, it has been attempted over years to explore the use of manganese oxide as an inexpensive catalyst for air cell use. For example, U.S. Pat. Nos. 3,948,684, 4,121,018 and 4,269,691 teach such catalysts. According to these patents, various types of chemical manganese are subjected to chemical or heat treatment so as to precipitate $MnO_2$, $Mn_2O_3$ or/and $Mn_3O_4$ on carbon or mix $\gamma MnO_2$ with carbon and alkali to constitute a catalyst.

As pointed out in the aforementioned United States Patents, manganese oxides have catalyst activity and some of them have satisfactory discharge characteristics at a current not exceeding several $mA/cm^2$ but these oxides are not necessarily fully satisfactory in high-rate discharge at a current of more than 10 $mA/cm^2$ and in discharge characteristics after storage. Under the circumstances there has been demanded a manganese oxide having improved catalyst activity and storage stability.

DISCLOSURE OF THE INVENTION

This invention relates to a catalyst for an alkaline air cell, said catalyst comprising a manganese oxide obtainable by heat-treating $\gamma$-manganese oxyhydroxide ($\gamma$-MnOOH), particularly a manganese oxide obtainable by heat-treating $\gamma$-MnOOH at a temperature between 250° C. and 450° C. and whose X-ray diffraction pattern is mainly characteristic of $Mn_5O_8$.

The manganese oxyhydroxide $\gamma$-MnOOH used for the practice of this invention occurs as acicular crystals as shown in FIG. 1, which crystals having a major-axis length a of not more than $10\mu$ and a minor-axis length b of not more than $1\mu$, with an aspect ratio a/b of <10.

This acicular crystalline configuration remains unchanged even after the heat treatment.

FIG. 2 shows the thermogravimetric weight-loss curves of $\gamma$-MnOOH in various atmospheres. The inert atmospheres I of nitrogen, argon and helium gases and the air atmosphere II tend to show substantially the same course of weight change but in the temperature region indicated at b in FIG. 2, the weight changes in inert atmospheres I, i.e. nitrogen, argon and helium, are greater than in the air (II).

In regard to X-ray diffraction patterns, when the heat treatment in nitrogen, argon or helium is conducted at 250° to 300° C., $Mn_5O_8$ is produced in a substantial proportion although some amount of $\gamma$-MnOOH remains unreacted and a diffraction pattern characteristic of $Mn_5O_8$ and, to a lesser extent, of $Mn_3O_4$ is observed up to 450° C. but an X-ray diffraction pattern characteristic of $\alpha$-$Mn_2O_3$ is obtained at 500° C.

The heat treatment in air shows substantially the same tendency as that in nitrogen or argon but $Mn_5O_8$ is predominant in the region of 250° to 300° C., where $\beta$-$MnO_2$ in addition to $\gamma$-MnOOH can also be confirmed by reference to ASTM Data File.

A study conducted in the aforementioned various atmospheres and temperature regions showed that although $\gamma$-MnOOH as such has only little catalytic activity, a very high catalytic activity is obtained under the conditions conducive to an X-ray diffraction pattern characteristic of $Mn_5O_8$ and the storage stability of the product in alkaline electrolyte is also very high.

In the heat-treating temperature region of 500° C. and higher, there occurs a transition to $\alpha$-$Mn_2O_3$ so that although the catalytic activity in initial discharge is satisfactory, the stability of this oxide in electrolyte is somewhat inferior to that of $Mn_5O_8$.

FIG. 3 shows a typical X-ray diffraction pattern (copper (Cu) target, carbon filter, voltage 40 KV, current 40 mA) of $Mn_5O_8$ obtained by heat-treating $\gamma$-MnOOH in nitrogen gas at 400° C. for 2 hours. In FIG. 3, the horizontal axis represents 2θ and the vertical axis represents the peak intensity.

According to ASTM Data File, the lattice constant (d) and diffraction peak intensity ($I/I_1$) values of $Mn_5O_8$ are as reproduced in Table 1.

TABLE 1

| d | 4.88 | 4.09 | 3.10 | 2.80 | 2.47 | 2.34 | 1.90 | 1.59 |
|---|------|------|------|------|------|------|------|------|
| $I/I_1$ | 100 | 40 | 70 | 70 | 50 | 60 | 70 | 50 |

The representative d values in the X-ray diffraction pattern of the manganese oxide according to this invention are shown in Table 2.

TABLE 2

| d | 4.88 | 4.09 | 3.09 | 2.79 | 2.76 | 2.48 | 2.35 | 2.03 | 1.90 | 1.59 | 1.54 |
|---|------|------|------|------|------|------|------|------|------|------|------|

It is clear that the manganese oxide according to this invention shares many of the peak positions of $Mn_5O_8$ in ASTM Data File.

However, since the relative intensities of diffraction peaks may vary with different crystal shapes, conditions of recording the X-ray diffraction pattern, and heat-treating temperatures, the relative intensity values do not necessarily correspond to the values in ASTM Data File. FIG. 4 shows the X-ray diffraction pattern of the manganese oxide obtained by heat-treatment at 300° C.

and FIG. 5 shows the pattern of the manganese oxide obtained at 450° C.

For the same reason as mentioned above, diffraction peak positions may also be displaced by ± about 0.02.

Chemical analysis of the MnOx obtained by the heat treatment of γ-MnOOH showed that the value X=1.6 corresponding to $Mn_5O_8$ is not necessarily obtained even when the heat treatment is conducted at 400° C. Rather, the value of X is smaller than 1.6 in many instances.

The chemical analysis for determination of X was performed as follows. First, MnOx was dissolved in known quantities of oxalic acid and sulfuric acid and the unreacted oxalic acid was titrated with potassium permanganate to find the proportion of $MnO_2$. Then, MnOx was dissolved in hydrochloric acid and titrated with EDTA to find the proportion of metallic Mn. From these data, X in MnOx was computed by means of the following equation.

$$x = \frac{\frac{a}{86.938}}{\frac{b}{54.938}} + 1$$

where,
a = weight percent of $MnO_2$
b = weight percent of Mn

The value of x for MnOx as calculated by the above procedure was found to satisfy the condition $1.45x \leq 1.60$ when the heat-treating temperature was 250° C. or higher, irrespective of the atmosphere in which γ-MnOOH was heat-treated.

This finding indicates that while the manganese oxide obtainable by heat-treating γ-MnOOH shows many of the characteristics of $Mn_5O_8$ according to ASTM Data File, not only $Mn_5O_8$ but other special manganese oxides close to $Mn_5O_8$ were formed as well.

As aforementioned, the manganese oxide obtained by the method of this invention occur as acute acicular crystals and has characteristics of $Mn_5O_8$ in X-ray diffraction pattern.

Using this manganese oxide, a catalyst electrode is manufactured in the following manner.

The manganese oxide according to this invention is admixed with activated carbon, carbon black and an aqueous fluorine-containing resin dispersion to prepare a paste, which is then coated over a screen of stainless steel, silver or the like. The sheet thus formed is then dried and heat-treated at a temperature of about 300° C. so as to slightly sinter the fluorine-containing resin. In this composition the fluorine-containing resin acts as a binder and a repellent against alkaline electrolyte, etc. The activated carbon serves as a catalyst support but since it is low in electrical conductivity, carbon black is added. In some cases, carbon black alone can be used as a catalyst support in lieu of activated carbon.

The above catalyst electrode can be provided in wafer thickness, for example in a thickness less than 0.2 mm.

BEST MODE OF CARRYING OUT THE INVENTION

Figure 1:
FIG. 1 is a transmission electron microphotograph showing the crystallographic structure of γ-manganese oxyhydroxide according to this invention at a magnification of ×10000.
Figure 2:
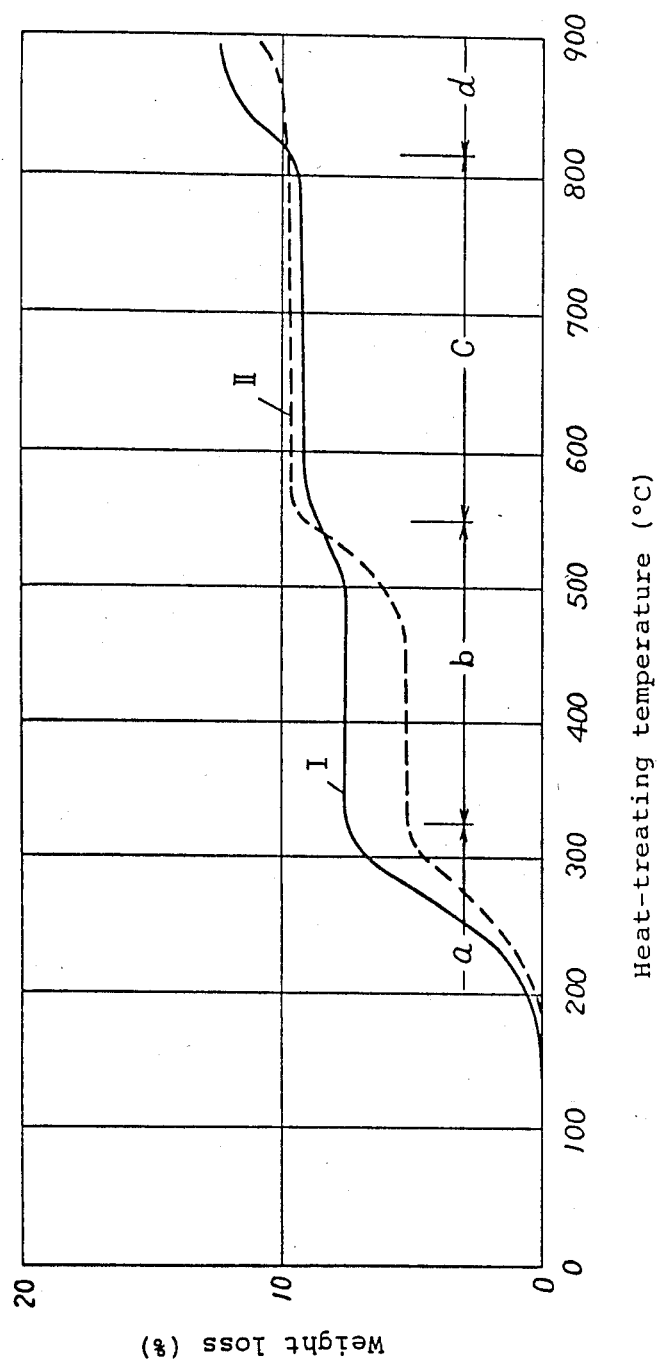
FIG. 2 is a thermogravimetric weight-change curve of said γ-manganese oxyhydroxide.
Figure 3:
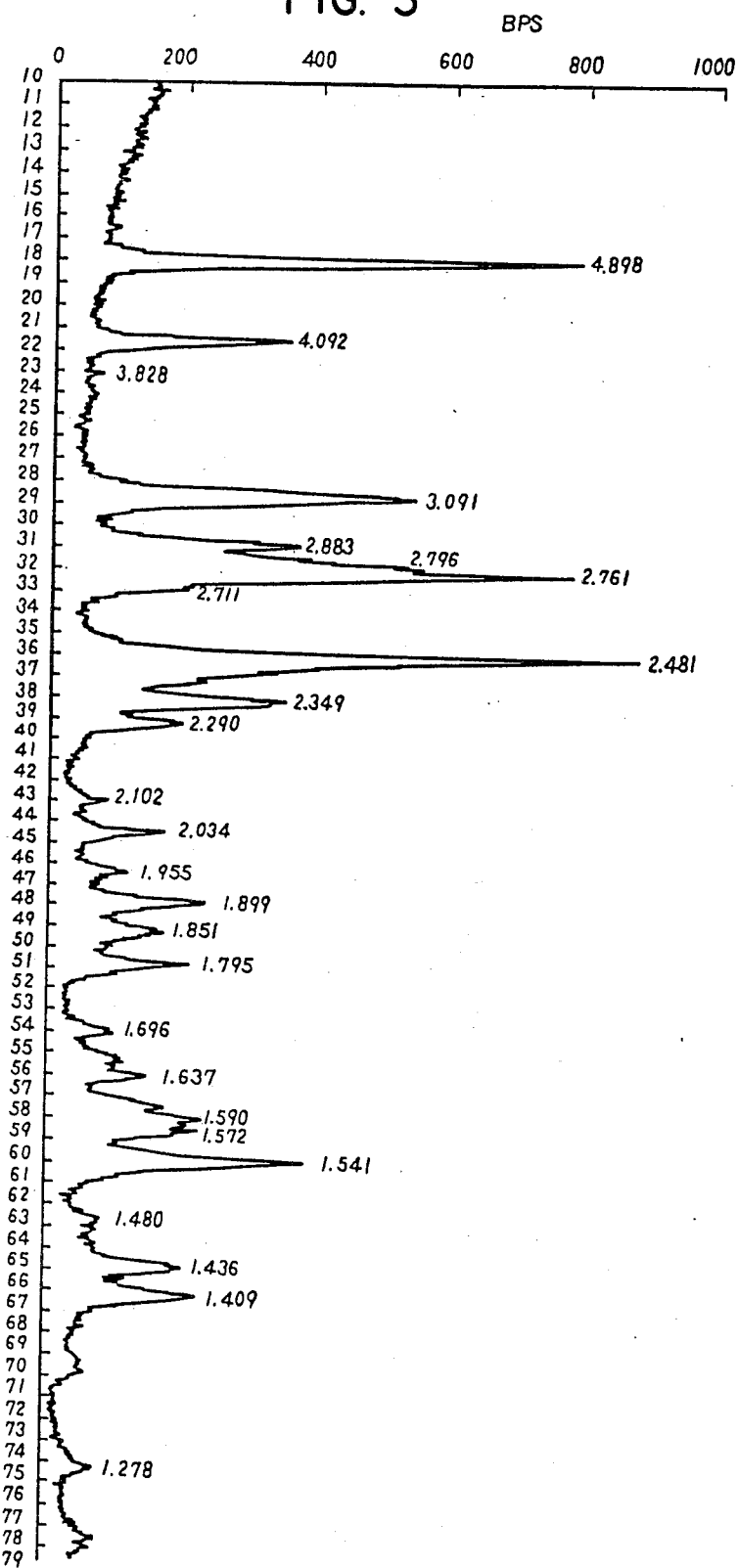
FIGS. 3, 4 and 5 show the X-ray diffraction patterns (target: Cu) of γ-manganese oxyhydroxides obtained by heat-treatment at 400° C., 300° C. and 450° C., respectively.
Figure 4:
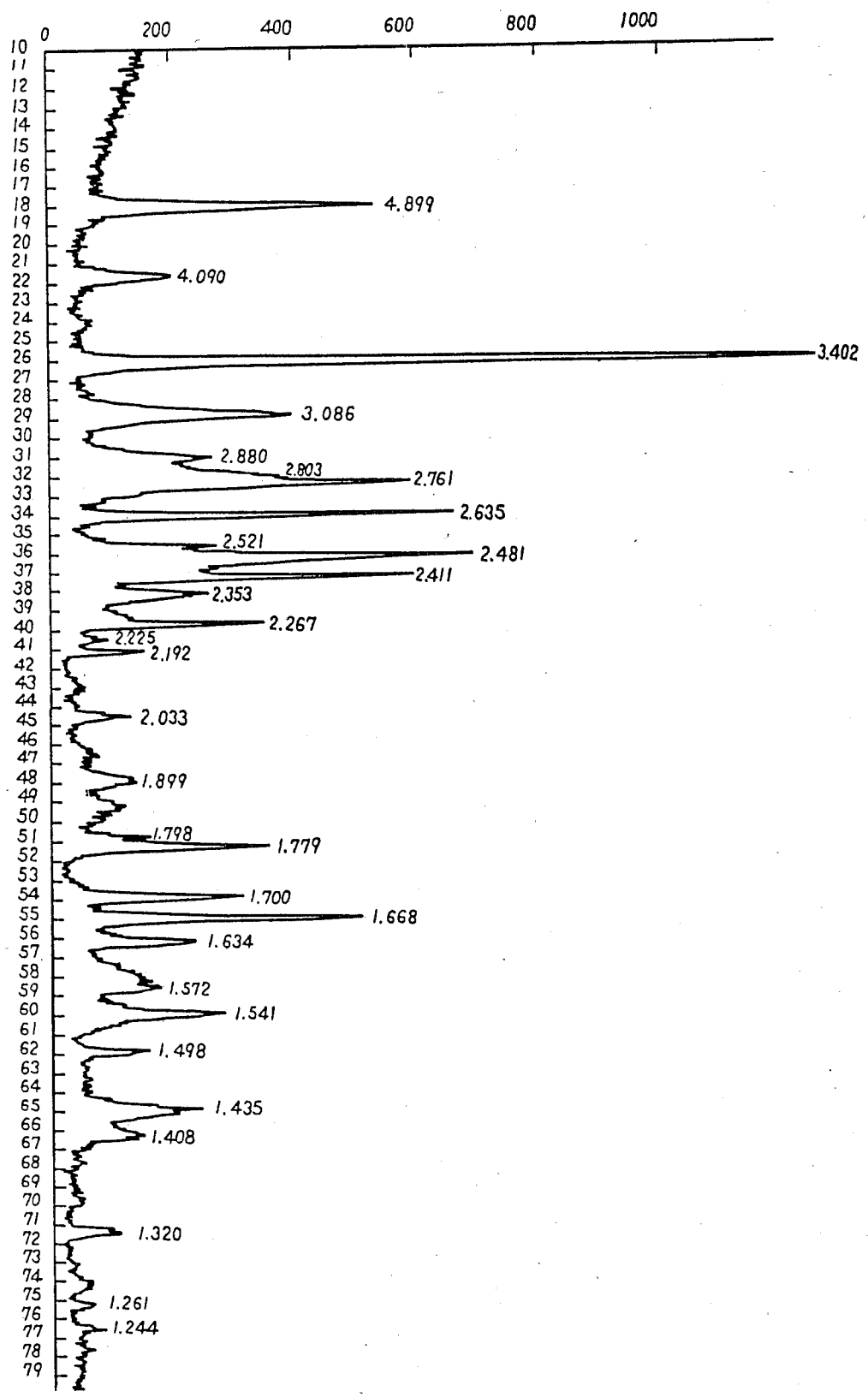
Figure 5:
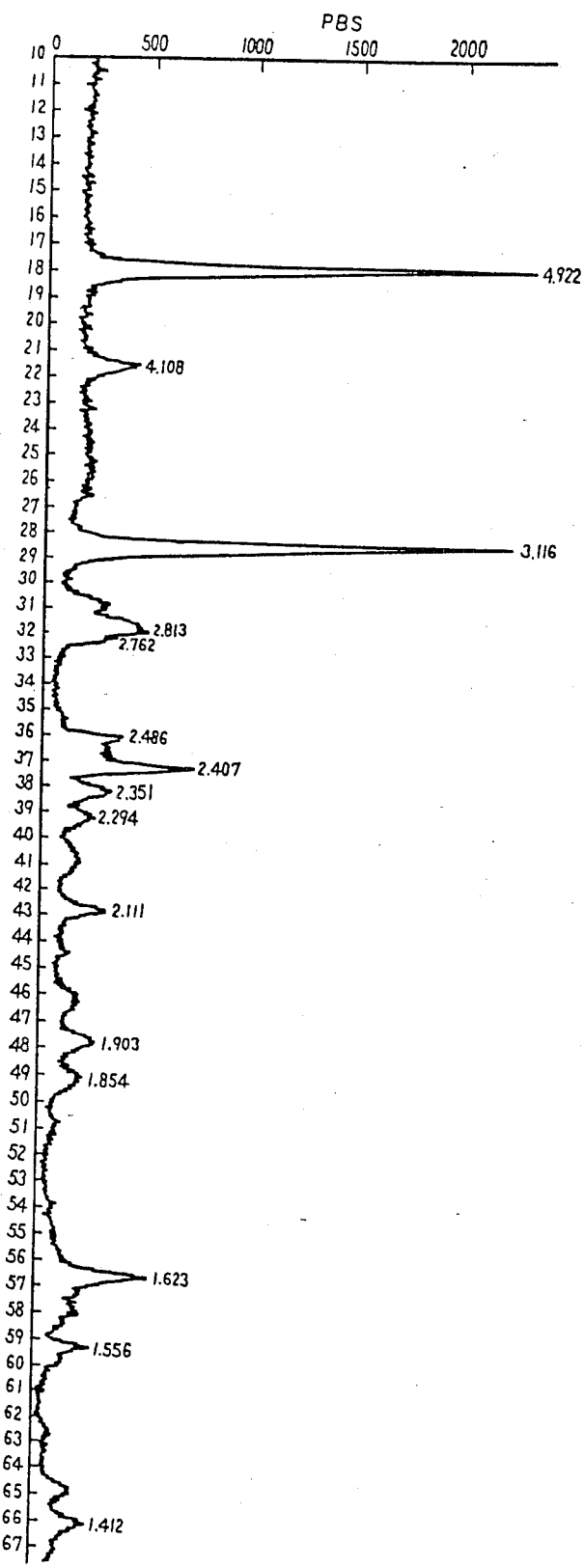

The following examples and control examples are further illustrative of this invention.

The manganese oxide obtained by heat-treating, γ-MnOOH (30 weight parts) was mixed with 20 weight parts of activated carbon, 20 weight parts of carbon black, 30 weight parts (as nonvolatile matter) of an aqueous dispersion of polyethylene tetrafluoride, and 100 weight parts of distilled matter. The mixture was kneaded well and rolled to give a 0.5 mm-thick sheet. The sheet was filled into a nickel screen with a wire diameter of 0.1 mm and a mesh size of 40 meshes, dried and pressed to give a catalyst sheet with a thickness of 0.4 mm. This catalyst sheet was heat-treated at 300° C. for 15 minutes to sinter the polyethylene tetrafluoride component for increased water repellency. The sintered catalyst sheet was punched to give an air-zinc button cell catalyst electrode with a diameter of 11.0 mm. The diameter of the effective area of this catalyst electrode was 9.0 mm.

This sheet electrode was laminated with a 0.2 mm-thick porous polyethylene tetrafluoride film of the same size to render the sheet gas-permeable but liquid-impermeable.

This catalyst electrode was then assembled as follows to provide an air button cell.

First, an air diffusion pad 3 was set in position on the inside bottom of a positive electrode case 1 having air access holes 2 through the bottom, and the catalyst electrode 5 laminated with polyethylene tetrafluoride film 4 was set in position, followed by insertion of a separator 6.

Then, a metal-clad seal plate configured in the form of a dish 7 was assembled with a seal ring 8 of synthetic resin to provide a sealing assembly. This sealing assembly was filled with zinc powder as a negative electrode active material 9 and an alkaline electrolyte.

Figure 6:
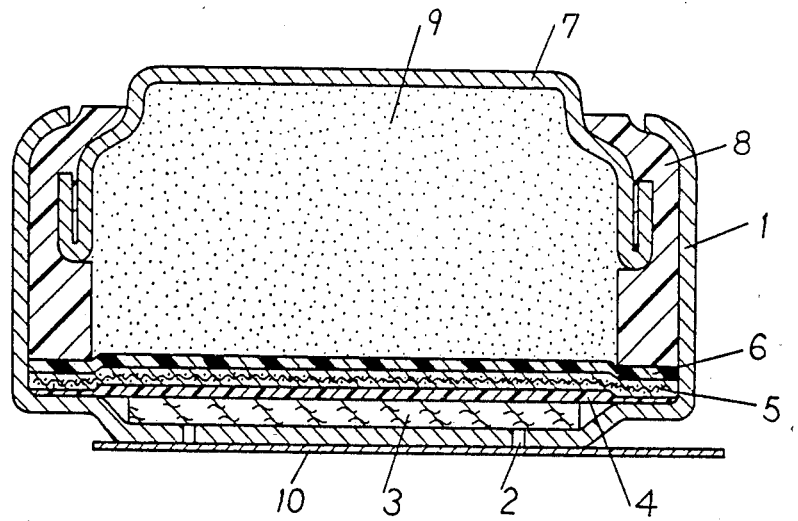
FIG. 6 is a sectional view showing an air-zinc button cell embodying this invention.

The sealing assembly containing the negative electrode was fitted with the above positive electrode case containing the positive electrode and other members and the whole assembly was sealed tightly with a metal mold to give a leak-tight air-zinc button cell as illustrated in FIG. 6. Indicated at 10 is a seal paper for closing the air access holes 2 which is peeled off to expose the holes 2 when the button cell is used.

EXAMPLE 1

γ-MnOOH was heat-treated in the air at temperatures varying at intervals of 50° C. from 200° to 700° C. for about 3 hours to give manganese oxides. Each of these manganese oxides (30 weight parts) was kneaded with 20 weight parts of activated carbon, 20 weight parts of carbon black and 30 weight parts (as nonvolatile matter) of an aqueous dispersion of polyethylene tetrafluoride. The mixture was filled into a metal screen with a wire diameter of 0.1 mm and a mesh size of 40 meshes to give a 0.5 mm-thick catalyst sheet. This sheet was heat-treated at 300° C. for 20 minutes to sinter the polyethylene tetrafluoride component for added water repellency and, then, punched to give a catalyst electrode with a diameter of 11.0 mm. The effective diameter of this electrode was 9.0 mm.

This electrode was laminated with a 0.2 mm-thick porous polyethylene tetrafluoride film to provide an air cell electrode.

Using this air cell electrode as a positive electrode, zinc as a negative electrode, and an aqueous solution of potassium hydroxide as an electrolyte, an air cell was fabricated. Thus, the positive and negative electrodes were placed in juxtaposition with a microporous resin separator therebetween to fabricate an air-zinc button cell with a diameter of 11.6 mm and a total height of 5.4 mm (IEC Standard Size R44) as illustrated in FIG. 6. In the order of decreasing temperatures for the heat treatment of γ-MnOOH, these cells were designated $A_1$ through $A_{11}$ and the average discharge voltages at a temperature of 20° C. and a load resistance of 130 Ω were measured, both immediately after manufacture and after storage at 60° C. for 1 month. The results are indicated by the legend O in FIG. 7.

EXAMPLE 2

γ-MnOOH was heat-treated in nitrogen gas at temperatures varying at 50° C. intervals from 200° to 700° C. for about 3 hours to give manganese oxides and using these manganese oxides, air cells were fabricated in the same manner as Example 1. These cells were designated $B_1$ through $B_{11}$ and evaluated as Example 1. The results are indicated by the legend Δ in FIG. 7.

EXAMPLE 3

γ-MnOOH was heat-treated in argon gas by the same procedure as Examples 1 and 2 and air cells $C_1$ through $C_{11}$ were fabricated using the product catalysts and evaluated. The results are indicated by the legend ∇ in FIG. 7.

CONTROL EXAMPLE

As a control run, untreated γ-MnOOH was admixed with activated carbon, carbon black and an aqueous dispersion of polyethylene tetrafluoride in the same proportions as in Example 1 and using the resultant catalyst, an air cell was fabricated in the same manner as Example 1. The cell was designated D.

Similarly a control cell E was fabricated using β-$MnO_2$ obtainable by pyrolysis of manganese nitrate in the same manner as above.

These cells D and E were evaluated in the same manner as Examples 1, 2 and 3. The results are also shown in FIG. 7.

Figure 7:
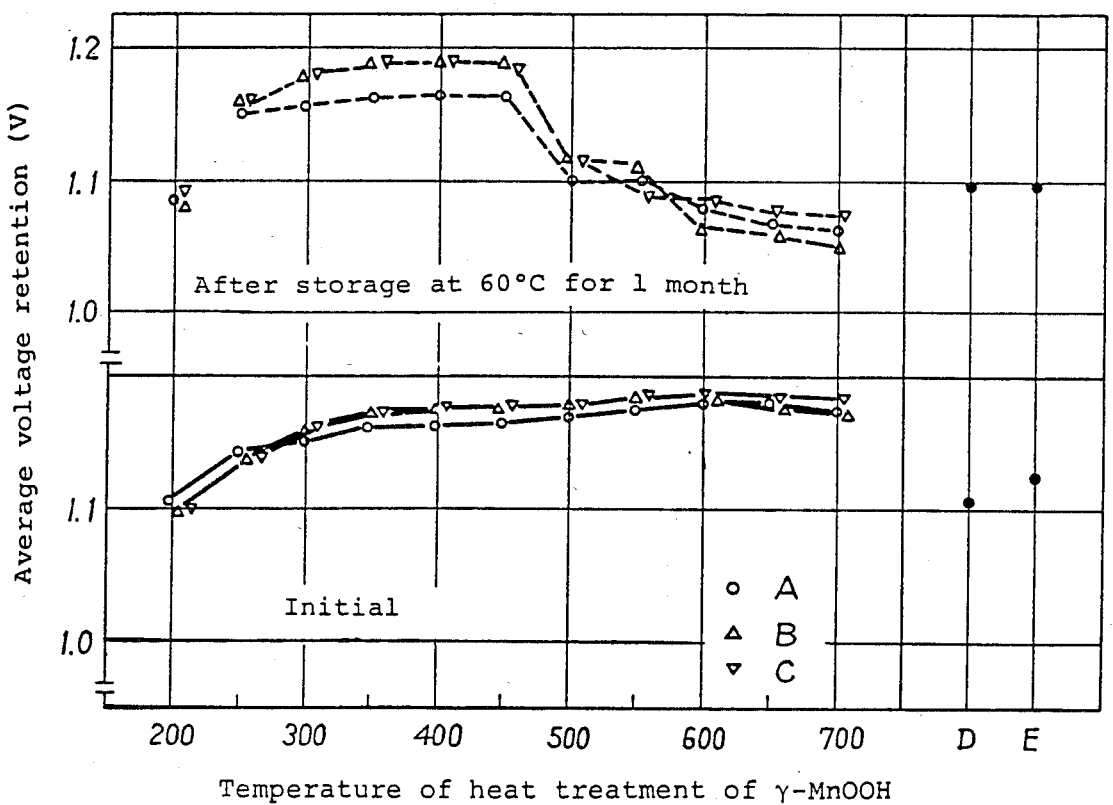
FIG. 7 shows the average retention voltages in continuous discharge at a temperature of 20° C. and a load resistance of 130 Ω as determined for the catalyst electrodes obtained by heat-treating γ-manganese oxyhydroxide in the atmosphere of air A, nitrogen B or argon C at various temperatures each as built into an air-zinc button cell.

It will be apparent from FIG. 7 that irrespective of the heat-treating atmospheres of air O, nitrogen Δ, and argon ∇, the initial characteristics of the cells were superior to those of the conventional cells D and E when the heat-treating temperatures were in the range of 250° to 700° C. but after 1-month storage at 60° C., the heat-treating temperatures from 250° to 450° C. proved more satisfactory for all the atmospheres and especially the post-storage characteristics approximately at par with the initial characteristics were obtained when the heat-treating temperature was somewhere in the region of 300° C. to 400° C. There was no difference between nitrogen and argon, and in both cases the retention voltage was higher than the initial level and slightly higher than that obtainable using air as the heat-treating atmosphere when the temperature was in the range of 300° to 400° C.

The temperature region conducive to such superior characteristics is the region where many of the peak positions in the aforementioned X-ray diffraction pattern agreed with those of $Mn_5O_8$.

It is, therefore, clear that the catalysts whose X-ray diffraction peaks correspond more or less to those of $Mn_5O_8$ have satisfactory catalyst activity and are stable in alkaline electrolyte.

Particularly, since the manganese oxide obtained using γ-MnOOH as a starting material in accordance with this invention occur as acute needles, it is effectively brought into contact and interlaced with the activated carbon, carbon black, fluorine-containing resin, and metal screen which together form the catalyst electrode. Since the parameters of water repellency, hydrophilicity and electrical conductivity are all realized in a single crystal domain, there appears to be at work a favorable influence on catalytic activity and storage stability.

Figure 8:
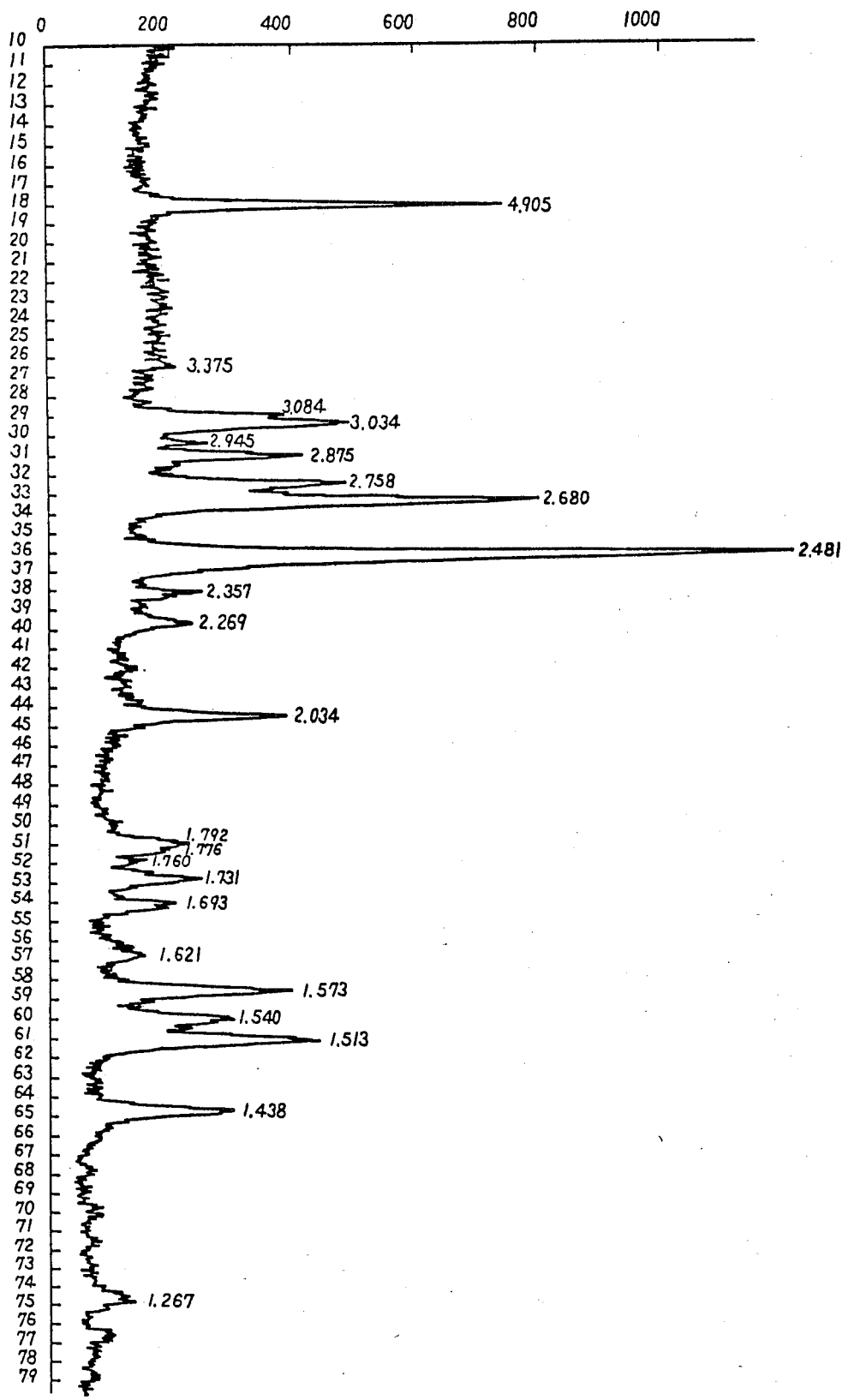
FIG. 8 shows the X-ray diffraction pattern of manganese oxide after storage.

While the manganese oxide obtainable by heat-treating γ-MnOOH shows stable catalytic characteristics even after prolonged storage, its X-ray diffraction pattern after storage is not necessarily identical with the initial pattern but may change as shown in FIG. 8. This is because the manganese oxide is further stabilized in alkaline medium.

INDUSTRIAL APPLICABILITY

The catalyst employing the manganese oxide of this invention features a high retention voltage at high-rate discharge and has excellent storage characteristics as compared with the conventional manganese oxide or manganese oxyhydroxide.

We claim:

1. An air cell including a catalyst comprising a manganese oxide whose X-ray diffraction peaks corresponding to its lattice constants have the characteristics of $Mn_5O_8$ and whose chemical analysis for $MnO_x$ satisfies the condition $1.45x \leq 1.60$.

2. An air cell as claimed in claim 1 wherein said manganese oxide occurs as acicular crystals.

3. An air cell as claimed in claim 1 wherein the catalyst is composed of manganese oxide as a main component and activated carbon, carbon black and fluorine-containing resin as additive components.

4. An air cell as claimed in claim 1 wherein the air cell is composed of said manganese oxide catalyst as a main component and carbon black and fluorine-containing resin as additive components.

5. An air cell including a catalyst comprising a manganese oxide whose X-ray diffraction peaks corresponding to its lattice constants d with copper (Cu) as the target are $4.90 \pm 0.02$, $3.09 \pm 0.02$, $2.48 \pm 0.02$, $2.03 \pm 0.02$ and $1.54 \pm 0.02$.

6. An air cell including a catalyst comprising a manganese oxide as claimed in claim 5, wherein with the relative peak intensity $I/I_1$ at the lattice constant $d = 2.48 \pm 0.02$ of its X-ray diffraction pattern being taken as 100, the relative peak intensity at $d = 4.90 \pm 0.02$ lies between 50 and 100, the peak intensities at $d=3.09\pm0.02$ and $d=2.03+0.02$ are not greater than 70, and the peak intensity at $d=1.54\pm0.02$ is not greater than 50.

7. An air cell as claimed in claim 5 wherein said manganese oxide occurs as acicular crystals.

8. An air cell as claimed in claim 5 wherein the catalyst is composed of manganese oxide as a main component and activated carbon, carbon black and fluorine-containing resin as additive components.

9. An air cell as claimed in claim 5 wherein the air cell is composed of said manganese oxide catalyst as a main component and carbon black and fluorine-containing resin as additive components.

10. An air cell including a catalyst comprising a manganese oxide whose X-ray diffraction peaks in terms of lattice constants d with copper (Cu) as the target include $4.92\pm0.02$, $3.11\pm0.02$, $2.48\pm0.02$ and $1.62\pm0.02$.

11. An air cell including a catalyst comprising a manganese oxide as claimed in claim 10 wherein with the relative peak intensity $I/I_1$ at lattice constant $d=4.92\pm0.02$ in the X-ray diffraction pattern of said manganese oxide being taken as 100, the relative peak intensity at $d=3.11\pm0.02$ lies somewhere between 50 and 100 and the relative peak intensities at $d=2.48\pm0.02$ and $d=1.54\pm0.02$ are not greater than 50.

12. An air cell as claimed in claim 10 wherein said manganese oxide occurs as a circular crystals.

13. An air cell as claimed in claim 10 wherein the catalyst is composed of manganese oxide as a main component and activated carbon, carbon black and fluorine-containing resin as additive components.

14. An air cell as claimed in claim 10 wherein the air cell is composed of said manganese oxide catalyst as a main component and carbon black and fluorine-containing resin as additive components.

* * * * *